United States Patent
Ismail et al.

(10) Patent No.: US 11,852,645 B2
(45) Date of Patent: Dec. 26, 2023

(54) MODULAR WASH BRIDGE FOR MULTIPLE-PASS IMMUNOASSAY SYSTEMS

(71) Applicant: Siemens Healthcare Diagnostics Inc., Tarrytown, NY (US)

(72) Inventors: Ayman Ismail, Tarrytown, NY (US); Eric Gerolstein, Melbourne, FL (US); Brian Bolger, Elmsford, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 594 days.

(21) Appl. No.: 16/629,026

(22) PCT Filed: Jun. 22, 2018

(86) PCT No.: PCT/US2018/038940
§ 371 (c)(1),
(2) Date: Jan. 6, 2020

(87) PCT Pub. No.: WO2019/010015
PCT Pub. Date: Jan. 10, 2019

(65) Prior Publication Data
US 2020/0132707 A1    Apr. 30, 2020

Related U.S. Application Data

(60) Provisional application No. 62/529,595, filed on Jul. 7, 2017.

(51) Int. Cl.
*G01N 35/02* (2006.01)
*G01N 35/00* (2006.01)
(Continued)

(52) U.S. Cl.
CPC .......... *G01N 35/025* (2013.01); *G01N 21/11* (2013.01); *G01N 35/0098* (2013.01);
(Continued)

(58) Field of Classification Search
None
See application file for complete search history.

(56) References Cited

U.S. PATENT DOCUMENTS 5,380,487 A * 1/1995 Choperena ......... G01N 35/0092
422/65
5,575,976 A * 11/1996 Choperena ........... G01N 35/021
422/65
(Continued)

FOREIGN PATENT DOCUMENTS

CN       1466685 A    1/2004
CN    101002099 A    7/2007
(Continued)

OTHER PUBLICATIONS

Extended EP Search Report dated Aug. 14, 2020 of corresponding European Application No. 18828479.8, 5 Pages.
(Continued)

*Primary Examiner* — P. Kathryn Wright

(57) ABSTRACT

A wash system for use in an in vitro diagnostic immunoanalyzer utilizes a bridge having a linear track to move cuvettes from one incubation ring portion to another incubation ring portion. Washing stations along the linear track provide a magnetic field and fluid washing of cuvette contents independent of the size and motion of one or more incubation rings.

15 Claims, 7 Drawing Sheets

(51) Int. Cl.
 *G01N 21/11* (2006.01)
 *G01N 35/04* (2006.01)
(52) U.S. Cl.
 CPC ............ *G01N 2021/115* (2013.01); *G01N 2035/00346* (2013.01); *G01N 2035/0437* (2013.01); *G01N 2035/0455* (2013.01); *G01N 2035/0463* (2013.01); *G01N 2035/0465* (2013.01)

(56) References Cited

U.S. PATENT DOCUMENTS

| | | | |
|---|---|---|---|
| 6,436,349 | B1 | 8/2002 | Carey et al. |
| 6,555,062 | B1* | 4/2003 | Lewis ............... G01N 35/021 422/549 |
| 2003/0017613 | A1 | 1/2003 | Jakubowicz et al. |
| 2005/0014274 | A1 | 1/2005 | Lee et al. |
| 2010/0112567 | A1* | 5/2010 | Adolfsen ............... B01L 7/54 435/6.16 |
| 2014/0287523 | A1 | 9/2014 | Donohue |
| 2017/0045541 | A1 | 2/2017 | Cohen et al. |

FOREIGN PATENT DOCUMENTS

| | | |
|---|---|---|
| CN | 102422163 A | 4/2012 |
| CN | 103354906 A | 10/2013 |
| CN | 104777321 A | 7/2015 |
| EP | 0317677 A1 | 5/1989 |
| EP | 0 502 638 A2 | 9/1992 |
| GB | 8607251 | 4/1986 |
| GB | 2190889 A | 12/1987 |
| JP | H07-181189 A | 7/1995 |
| JP | 2001-013151 A | 1/2001 |
| JP | 2012-173180 A | 9/2012 |
| WO | 2014/074762 A1 | 5/2014 |
| WO | 2014074762 A1 | 5/2014 |
| WO | 2018/169651 A1 | 9/2018 |

OTHER PUBLICATIONS

PCT International Search Report and Written Opinion dated Sep. 14, 2018 (8 Pages).

* cited by examiner

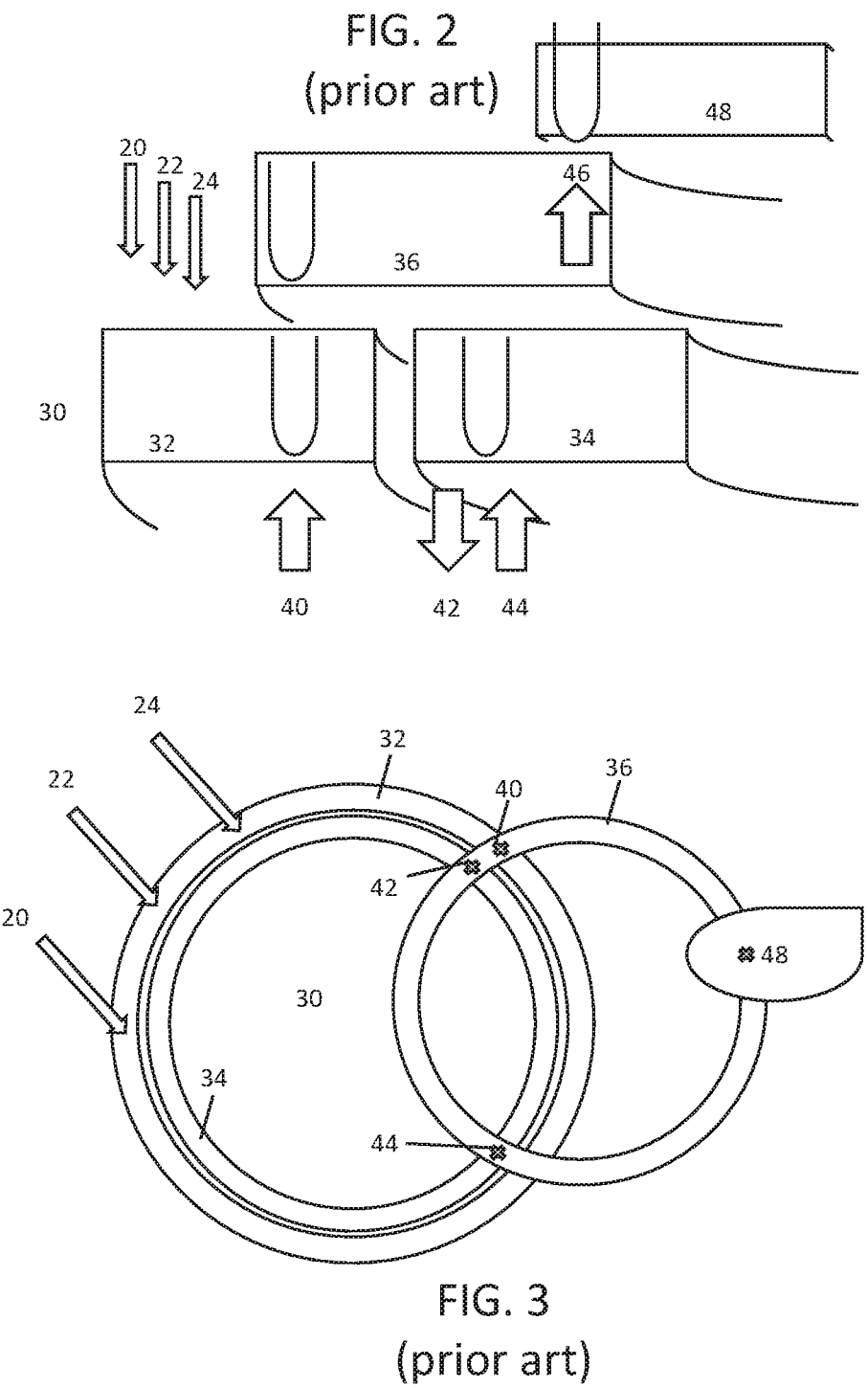

MODULAR WASH BRIDGE FOR MULTIPLE-PASS IMMUNOASSAY SYSTEMS

CROSS-REFERENCE TO RELATED APPLICATIONS

This application claims the benefit of U.S. Provisional Application Ser. No. 62/529,595 filed Jul. 7, 2017, which is incorporated herein by reference in its entirety.

TECHNOLOGY FIELD

The present invention relates, in general, to an automated immunoassay analyzer system for use in a laboratory environment and, more particularly, to systems and methods for handling and performing testing on patient samples for in vitro diagnostics in a immunoassay analyzer.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) onto which fluid containers, such as tubes containing patient samples have been loaded. The analyzer extracts a liquid sample from the tube and combines the sample with various reagents in special reaction cuvettes or tubes (referred to, generally, as reaction vessels or cuvettes).

A modular approach is often used for analyzers. Some larger systems include a lab automation system that can shuttle patient samples between one sample processing module and another module. These modules include one or more stations, including sample handling stations and testing stations. Testing stations are units that specialize in certain types of assays and provide predefined testing services to samples in the analyzer. Exemplary testing stations include immunoassay (IA) and clinical chemistry (CC) stations. In some laboratories, typically including smaller labs, these testing stations can be provided as independent/standalone analyzers or testing modules, allowing an operator to manually load and unload individual samples or trays of samples for CC or IA testing at each station in the lab.

A typical IA analyzer module is a clinical analyzer (integrated into a larger analyzer or standing alone) that automates heterogeneous immunoassays using magnetic separation and chemiluminescence readout. Immunoassays take advantage of the existence of either specific antibodies for the analytes being tested or specific antigens for the antibodies being tested. Such antibodies will bond with the analyte in the patient's sample to form an "immune complex." In order to use antibodies in immunoassays, they are modified in specific ways to suit the needs of the assay. In heterogeneous immunoassays, one antibody (capture antibody) is bound to a solid phase, a fine suspension of magnetic particles for the IA module, to allow separation using a magnetic field followed by a wash process. This is exemplified in sandwich assays and competitive assays. An exemplary IA module menu can include additional variations on these formats.

In the typical sandwich assay format, two antibodies are used, each one selected to bind to a different binding site on the analyte's molecule, which is usually a protein. One antibody is conjugated to the magnetic particles. The other antibody is conjugated to an acridinium ester molecule (AE). During the assay, sample and the two modified antibody reagents are added to a cuvette. If the analyte is present in the patient's sample, the two modified antibodies will bind and "sandwich" the analyte molecule. Then, a magnetic field is applied which will attract the magnetic particles to the wall of the cuvette, and excess reagents are washed off. The only AE-tagged antibody left in the cuvette is one that formed an immune complex through the sandwich formation with the magnetic particles. Acid solution is then added to free up the AE into solution, which also includes hydrogen peroxide needed for the chemiluminescence reaction. A base is then added to cause it to decompose, emitting light (see reaction formulas below—a variety of AEs are used in various assays but the fundamental chemistry is substantially identical). Light is emitted as a flash lasting a few seconds and is collected and measured in a luminometer. The integrated light output is expressed as relative light units (RLU's). This is compared to a standard curve, which is generated by fitting a dose-response curve to RLU values generated by known standards of the same analyte over its clinical range. Sandwich assays produce a direct dose-response curve where higher analyte doses correspond to increased RLUs.

The competitive assay format applies to molecules for which only one antibody is used. This antibody is conjugated to the magnetic particles. A second assay reagent contains the analyte molecule conjugated to the AE. During the assay, the quantities of the reagents are chosen such that the analyte from the patient's sample and the AE-tagged analyte compete for a limited amount of the antibody. The more patient analyte there is, the less AE-tagged analyte will bind to the antibody. After magnetic separation and wash, the only source of AE in the cuvette is from AE-tagged analyte that has been bound to the magnetic particles through the antibody. Acid and base are added as before, and the dose analysis is as described for the sandwich assay. Competitive assays produce an inverse dose-response curve, where a higher signal corresponds to a lower amount of analyte in the patient sample.

The IA analyzer module magnetic particle reagent is also referred to as the "solid phase" and the AE-tagged reagent is referred to as the "lite reagent." The IA analyzer module provides the hardware and software to enable running multiple assays of various formats concurrently in random-access and with high throughput.

At the heart of a typical IA analyzer/module is an incubation ring. To perform the above-described assays, the reactions need to take place at a well-controlled temperature range, typically coinciding with nominal temperature of the human body. An incubation ring provides a regulated thermal body to ensure that cuvettes maintain this temperature range while the cuvettes move in the IA module. By providing a ring, random access to cuvettes can be provided. This allows assays of varying length to be performed in parallel, allowing some cuvettes to receive analytes/reagents, some receive sample aliquots, some to be analyzed, some to be washed, etc. simultaneously. The ring can then be moved at regular intervals under processor control to ensure that reactions take place at a controlled incubation temperature for a prescribed time interval before analysis of the reaction. The typical incubator ring rotates relative to a fixed base, typically driven by a motor affixed to the base that drives a gear ring or belt on the moving ring.

FIG. 1 shows a cutaway view of an exemplary prior art incubation ring. Incubation ring 10 includes two primary parts that generally move together, rings 12 and 14. Inner magnetic ring 12 includes a plurality of arc-shaped magnets placed at specific locations along the circumference of ring 12. Moving along with ring 12 is outer ring 14, which includes a plurality of receptacles (called slots, but which can be any suitable shape) for cuvettes 16. Generally, rings 12 and 14 are locked together as they move, allowing cuvettes and outer ring 14 to be exposed to magnetic fields for a predetermined amount of time. After a predetermined cycle time, ring 12 shifts angularly by a predetermined amount relative to ring 14, indexing each cycle, such that cuvettes in ring 14 are exposed to the magnetic field for the predetermined amount of time, and each cuvette gets exposed to the field in succession. A drawback of this configuration is that the scheduling of the magnetic field exposure and wash cycle after a predetermined amount of time in the magnetic field can be complicated for a large number of samples in the ring 14, especially if incubation times are intended to be varied for these cuvettes, which may be difficult or impossible with such an arrangement.

Incubation temperature control is provided by a stationary heating element 18 placed under ring 10, allowing a uniform temperature to be applied to cuvettes 16. As cuvettes 16 move along ring 10, certain instruments interact with these cuvettes. Instruments 20 through 24 are spaced circumferentially from one another at predetermined locations. These instruments include a cuvette handler 20 that places fresh cuvettes into slots in the ring at a predetermined position. Once each cuvette is placed into the ring, the cuvette travels with the rotation of the ring until they reach the location of a reagent probe/pipette 22 that places an aspirated portion of a patient sample into the cuvette. After a sample portion is placed in a cuvette, the cuvettes travel with the motion of ring 10 to the location of reagent pipette 24, which dispenses the appropriate reagents for a given immunoassay being performed on the given patient sample. The cuvette then travels along with ring 10, where it is exposed to a magnetic field by the magnets in ring 12, the content of the cuvette being washed by a washing pipette in the process. Typically, a cuvette is exposed to two magnetic field/wash cycles. Eventually, the cuvettes reach the location of elevator 26, which pushes the cuvettes up out of ring 10 into position to be read by a luminometer 28.

A drawback of ring 10 is that the magnets in ring 12 must be curved to match the curvature of ring 12. This can be expensive to manufacture to the tolerances needed for medical testing. Furthermore, the throughput of the system is largely dictated by the radius of ring 10. For a given size of ring 10, the magnets of ring 12 must be designed specifically for that radius. Often it is desirable for a manufacturer to offer different models in a product family having different maximum throughputs to cater to customers having different needs. Because these systems require FDA approval, the radius of each ring 10 in a family of products must be independently certified, which can be time-consuming and expensive. Accordingly, a system such as that shown in FIG. 1 may not be a flexible design for family of products that have different throughput requirements for different models. A further drawback of this system is that this is only appropriate for a single-step immunoassay. The timing of the wash cycle directly affects the movement of all other cuvettes in the system, complicating scheduling.

Another exemplary prior art system 30 is shown in FIG. 2 in diagrammatic cutaway fashion. Rather than one ring 10 that holds cuvettes, such as that shown in FIG. 1, system 30 uses two cuvette incubation rings 32 and 34. These rings can move independently, providing random access to the contents of each ring. Meanwhile, an additional ring 36 is placed above concentric rings 32 and 34. Ring 36 is non-concentric with these rings, allowing ring 36 two intersect rings 34 and 32 overhead at different locations along the travel of rings 32 and 34. Ring 36 is used for the wash cycle, allowing cuvettes in this ring to be exposed to magnetic field for predetermined amount of time and washed, independently of the movement of rings 32 and 34. This allows more flexible incubation cycle times for cuvettes in rings 32 and 34. Piston elevators 40, 42, and 44 are actuators that facilitate movement of cuvettes starting in ring 32 into wash ring 36, down into ring 34 if an additional incubation and wash cycle is required for an assay. Once all incubation and wash cycles are complete for cuvettes, elevator 46 can move the cuvettes up into the luminometer 48 for reading the results of the assay.

FIG. 3 shows an overhead view of system 30. Rings 32 and 34 are concentric and allow for independent cuvette motion. Ring 32 interacts with instruments 20 through 24, as discussed. Wash ring 36 is non-concentric, allowing ring 36 to intersect rings 32 and 34 at predetermined locations. Elevators are placed at these locations to move cuvettes up and down from rings 32 and 34 into and out of ring 36. Elevator 46 at luminometer 48 allows the sample to be moved into the luminometer 48 for testing of the result of the immunoassay after prescribed incubation and wash times.

While the system provides more scheduling flexibility and a wider variety of immunoassays due to the potential for using rings of 32 and 34 for two stage assays, there are several drawbacks to system 30. First, because wash ring 36 is a ring, the same issues relating to manufacturing and certifying curved magnets apply as in ring 10. That is, ring 36 can be expensive to manufacture and ring 36 will be limited to a given diameter for all instances of analyzers to the product family unless additional certification testing is done for different diameter wash rings. Furthermore, multiple elevators can add additional expense and scheduling complexity.

SUMMARY

One or more of the shortcomings in the prior art can be addressed by providing a linear bridge wash system that transports the cuvettes along the linear track between portions of an incubation ring. This can include transport between portions of the same incubation ring or from one incubation ring to another.

According to one embodiment of the present invention, a linear wash system configured for use in an immunoanalyzer includes a bridge having a linear track configured to transport a plurality of sample cuvettes, a motorized belt configured to engage the plurality of sample cuvettes and provide motive force along the linear track, and one or more wash stations along the linear track. Each wash station includes one or more magnets configured to provide a magnetic field on plurality of sample cuvettes and a pipette/probe configured to rinse the contents of each cuvette while in the magnetic field. The linear track has an input end configured to receive each cuvette from a first cuvette incubation ring portion and an output end configured to deliver each cuvette to a second cuvette incubation ring portion. As used herein, a pipette or probe is a slender tubular element that is configured to aspirate and/or dispense a fluid, such as water or a rinsing agent.

According to some embodiments, the motorized belt is a serpentine belt made of rubber or similar material or a chain made of a rigid material, such as a plastic or metal timing chain, each with suitable shape to engage the cuvettes for transport along the linear track.

According to some embodiments, the input and output ends are configured to receive and deliver cuvettes to portions of a single incubation ring. According to one aspect, the linear track can be coplanar with the single incubation ring. According to another aspect, the input and output ends can be configured to receive and deliver cuvettes to portions of two non-concentric incubation rings. In another aspect, the linear track can be coplanar with the two non-concentric incubation ring.

According to some embodiments, the input and output ends are configured to receive and deliver cuvettes to portions of both two non-concentric incubation rings and a single incubation ring without recalibrating the one or more wash stations.

According to one embodiment of the present invention, an immunoanalyzer includes a cuvette incubation ring having a plurality of slots on an inner circumference of the incubation ring, each slot being configured to hold a sample cuvette and a drive mechanism to rotate the ring and a plurality of pipettes configured to interact with cuvettes in the cuvette incubation ring at predetermined locations. A linear wash bridge is configured to receive cuvettes from a first location of the cuvette incubation ring, wash the contents of each cuvette, and to deliver each cuvette to a second location of the cuvette incubation ring. A luminometer is configured to analyze the contents of each cuvette subsequent to each cuvette traveling along the linear wash bridge.

According to one aspect, the linear wash bridge can be coplanar with the cuvette incubation ring. In some embodiments, the immunoanalyzer includes an actuator configured to push each cuvette from the cuvette incubation ring at the first location to the linear wash bridge. This actuator can be a pneumatic or hydraulic piston, or an electromechanical element, such as a linear actuator.

In some embodiments, the linear wash bridge includes a linear track configured to transport the cuvettes, a motorized belt configured to engage each of the cuvettes and provide motive force along the linear track, and one or more wash stations along the linear track, each wash station comprising one or more magnets configured to provide a magnetic field on each cuvette and a pipette configured to rinse the contents of each cuvette while in the magnetic field.

According to one aspect, the cuvette incubation ring can include a heating element mounted in thermal contact with the ring and configured to rotate with the ring. According to another aspect, the linear wash bridge can include a plurality of magnets mounted to a linear track and can be further configured to be placed into another immunoanalyzer having two cuvette incubation rings and to pass cuvettes from one ring to the other, wherein such placement is accomplished without reconfiguring the plurality of magnets.

In another embodiment, an immunoanalyzer includes a first cuvette incubation ring having a plurality of slots on an inner circumference, where each slot is configured to hold a sample cuvette and a drive mechanism to rotate the first ring, and a second cuvette incubation ring having a plurality of slots on an outer circumference, where each slot is also configured to hold a sample cuvette and a drive mechanism rotates the second ring. A plurality of pipettes is configured to interact with cuvettes in the first cuvette incubation rings at predetermined locations. A linear wash bridge is configured to receive cuvettes from a first location of the first cuvette incubation ring, wash the contents of each cuvette, and to deliver each cuvette to a second location of the second cuvette incubation ring. A luminometer is configured to analyze the contents of each cuvette subsequent to each cuvette traveling along the linear wash bridge.

BRIEF DESCRIPTION OF THE FIGURES

FIG. 2 is a cross-sectional diagrammatic view of an exemplary prior art incubation ring;

FIG. 3 is an overhead diagrammatic view of an exemplary prior art incubation ring;

DETAILED DESCRIPTION OF THE EMBODIMENTS

Figure 1:
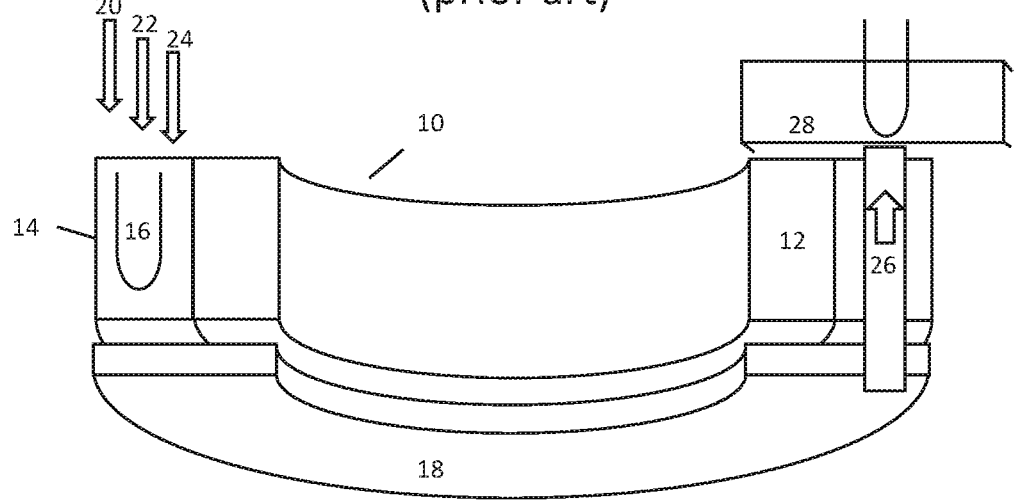
FIG. 1 is a cross-sectional diagrammatic view of an exemplary prior art incubation ring.

Embodiments of an immunoanalyzer and incubation/wash system for use therein utilize a linear wash system that acts as a bridge between two points in one or more incubation rings. By utilizing a linear bridge wash system, this bridge can be used with different sizes of incubation rings without needing to redesign and recertify the wash components between models within a product family, as is a problem in some prior art systems. Furthermore, linear components, such as a rectilinear magnets, can be manufactured and engineered more cheaply than arc-shaped magnets used in traditional ring-based wash systems. This can result in an overall reduction in engineering, manufacturing, and certification costs for a product family utilizing the linear bridge wash system.

Embodiments generally fall into two types of configurations. In the first configuration, a single incubation ring can be used. The ring has slots along the inner circumference of the ring. Those slots are open towards the center of the ring. A linear bridge is placed as a chord between two positions in the ring. That chord is preferably a radial chord passing through the center of the ring (e.g., coextensive with the ring diameter). When each cuvette slot rotates to the position where the bridge intersects the ring, the cuvettes in that slot can be pushed out of the slot towards the center of the ring, into the bridge. A conveyor system within the wash bridge then transports that cuvette past two wash stations. Each wash station has one or more magnets to provide a magnetic field and a probe (e.g., pipette or nozzle) for rinsing the contents of the cuvettes while exposed to the magnetic field. After being washed by two wash stations on the linear bridge, each cuvette is moved by the conveyor system of the linear bridge into a slot in the ring on the output side of the bridge. In embodiments where the bridge is across the center point of the ring, the input and output interfaces are at directly opposite sides of the ring. (Note that the input and output slots will move during the wash cycle, so the input and output slots can have any angular relationship depending on how the ring moves during the wash cycle.) The washed cuvette can then be elevated to a luminometer in a different location as the ring rotates. Washing and luminometer reading of test results can thereby be independently timed.

Another embodiment utilizes two non-concentric incubation rings, one inside another. By using nonconcentric rings, the wash bridge can be placed between the inner circumference of a larger ring and the outer circumference of a smaller ring. The outer ring has slots configured to hold cuvettes arranged along the inner circumference. The inner ring has slots configured to hold cuvettes arranged along the outer circumference of that ring. The wash bridge can transport cuvettes from the inner circumference of the larger ring to the outer circumference of the inner ring. This allows more slots for cuvette incubation than could be provided by a single ring. This can increase the throughput of the system without changing the wash bridge between embodiments having one ring and embodiments having two rings. Accordingly, the same wash bridge can be used for both single ring and double ring embodiments. Furthermore, in the multi-ring embodiment, the diameters of the two rings can be chosen to be any size, provided that the arrangement of the outer edge of the inner ring and inner edge of the outer ring is the same distance as the length of the wash bridge. In yet another embodiment that is less space efficient. The two-non-concentric rings can be placed beside one another, rather than using an inner and outer ring; slots are placed on the outside of each ring with the wash bridge between the rings. This can allow rings to be the same size or for rings to have any desired size relative to one another.

Figure 4:
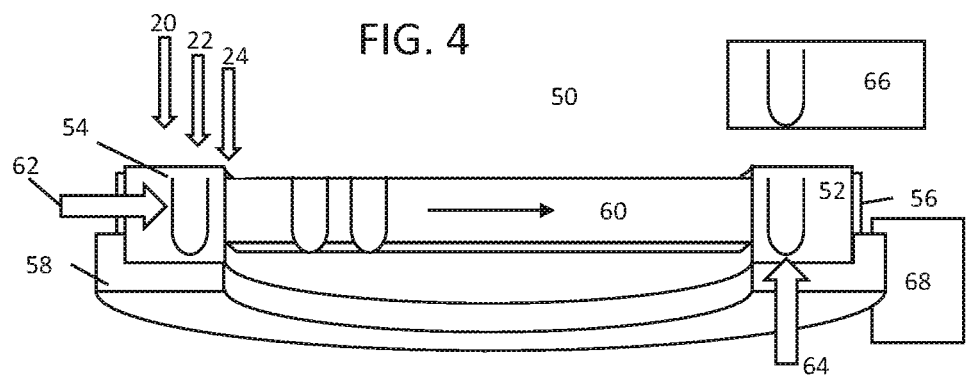
FIG. 4 is a cross-sectional diagrammatic view of an exemplary single incubation ring system for use with some embodiments.

FIG. 4 shows a cutaway view of an exemplary embodiment of a single ring system 50 using a linear wash bridge 60. System 50 includes a single incubation ring 52, which includes a plurality of circumferential slots with openings toward the center of the ring. Cuvettes 54 are placed into these slots by cuvette loader 20, and filled using a sample probe 22 and reagent probe 24. The rotation of ring 52 is in accordance with the prescribed movement program that provides random-access to cuvettes, while exposing the cuvettes to the predetermined incubation cycle. In this embodiment, a ring-mounted heating element 56 is placed in thermal contact with the surface of ring 52. This heating element 56 provides controlled thermal regulation to incubate cuvettes at a prescribed temperature, such as 37C. Power and control of heating element 56 can be provided by one or more slip rings 58. Slip rings 58 can be part of a larger static element that provides axial constraint to the rotation to ring 52. Additional information about the operation of heating element 56 and slip rings 58 can be found in U.S. Patent Application No. 62/472,472 filed on Mar. 16, 2017, entitled "System And Method For Thermal Control Of Incubation System In Diagnostic Analyzer," which is incorporated herein by reference in its entirety. In some embodiments, a static heating element that does not rotate with the incubation ring can be used.

When a cuvette is rotated to a predetermined position corresponding to the input side of wash bridge 60, a pushing element, such as a pusher 62, (e.g., a pneumatic/hydraulic piston, a linear actuator, a lead screw/rack and pinion device) provides a radial force on the cuvette to push the cuvette out of the slot in ring 52 and into the transport mechanism of wash bridge 60. Wash bridge 60 then transports the cuvettes linearly past a plurality of washing stations that include one or more linear magnets and a probe that uses aspirations and dispensing of a washing agent to wash the contents of the cuvette while exposed to a magnetic field of the magnets. After the washing steps are complete, cuvettes are delivered by the motion system that provides linear motive force on each cuvette across linear bridge to a slot on the other side of ring 52. Ring 52 is then rotated with the cuvette in that new slot until that cuvette reaches an elevator 64 (e.g., a pneumatic/hydraulic piston, a linear actuator, a lead screw/rack and pinion device) that lifts the cuvette into luminometer 66 for a luminosity reading to detect the results of the immunoassay. Rotational motive force can be provided to move the incubation ring by motor 68, via timing belts/chains or direct/gear drive. This allows ring 52 to rotate under computer control.

Figure 5:
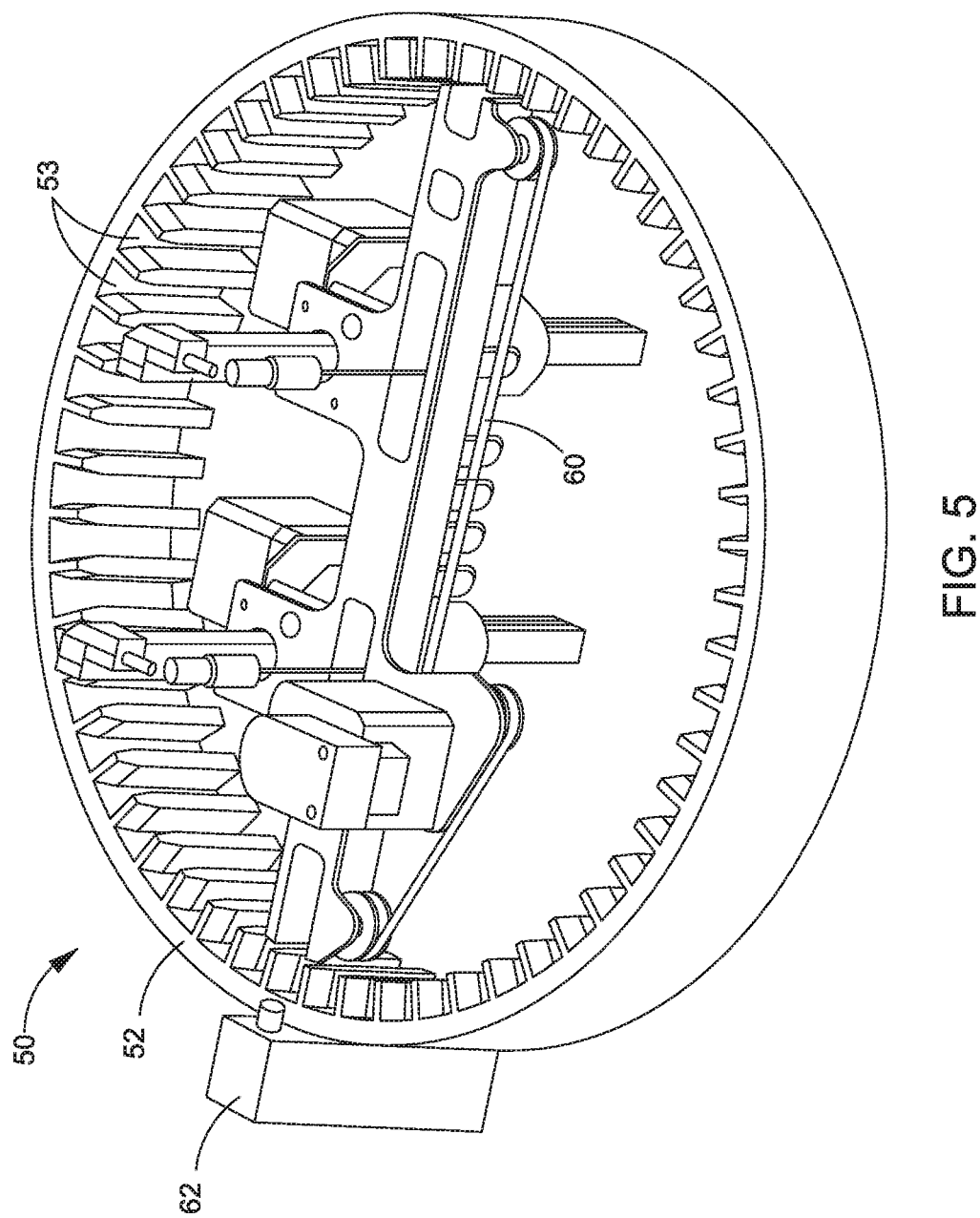
FIG. 5 is a perspective view of an exemplary single incubation ring system for use with some embodiments.

FIG. 5 is a perspective view of example embodiment 50. Incubation ring 52 includes a plurality of slots 53 configured to hold cuvettes on the inner circumference. When each slot aligns with the opening for wash bridge 60, a pusher pushes the cuvette into the motion system of wash bridge 60, where wash stations perform washing steps. After passing through the washing stations, the motion system of wash bridge 60 places the cuvette into an open slot on the opposite side of ring 52. This transfer can utilize another pusher device to place the cuvette into the receiving output slot of the incubation ring.

Figure 6:
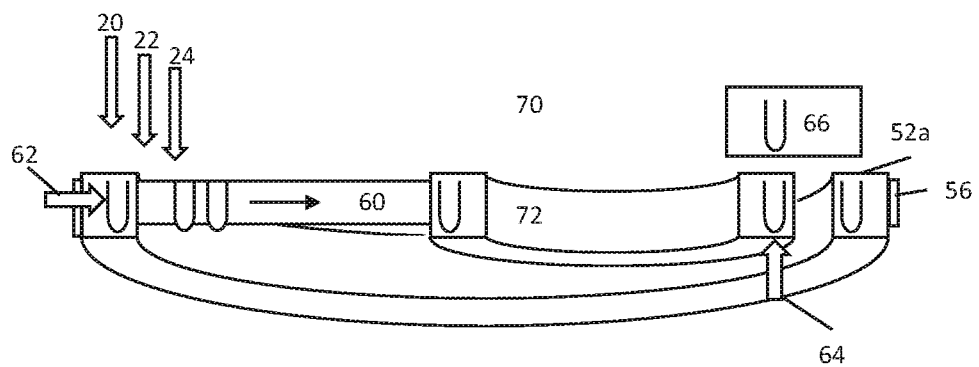
FIG. 6 is a cross-sectional diagrammatic view of an exemplary double incubation ring system for use with some embodiments.

FIG. 6 is a cutaway view of a system 70 where two incubation rings are used, joined by a wash bridge. Incubation ring 52a is a larger diameter incubation ring having the same configuration as incubation ring 52 in FIG. 4. A static slip ring is not shown, for visual clarity. Incubation ring 52 is thermally regulated by heating element 56 as previously discussed. In this embodiment, wash bridge 60 goes between the inner circumference of ring 52a and the outer circumference of smaller incubator ring 72. This allows a greater number of slots for cuvettes in these two rings. Ring 72 is also thermally regulated by a heating element (not shown). Cuvette slot are placed circumferentially around ring 72, oriented outwardly, allowing the slots to be exposed to bridge 60. Incubated cuvettes are pushed from ring 52a by piston 62 to wash bridge 60. Cuvettes exit wash bridge 60 via the motion mechanism of wash bridge 60 into an open slot in ring 72. Upon reaching the position 72 coincident with elevator 64, each cuvette is raised into luminometer 66 for reading the results of the assay.

Figure 7:
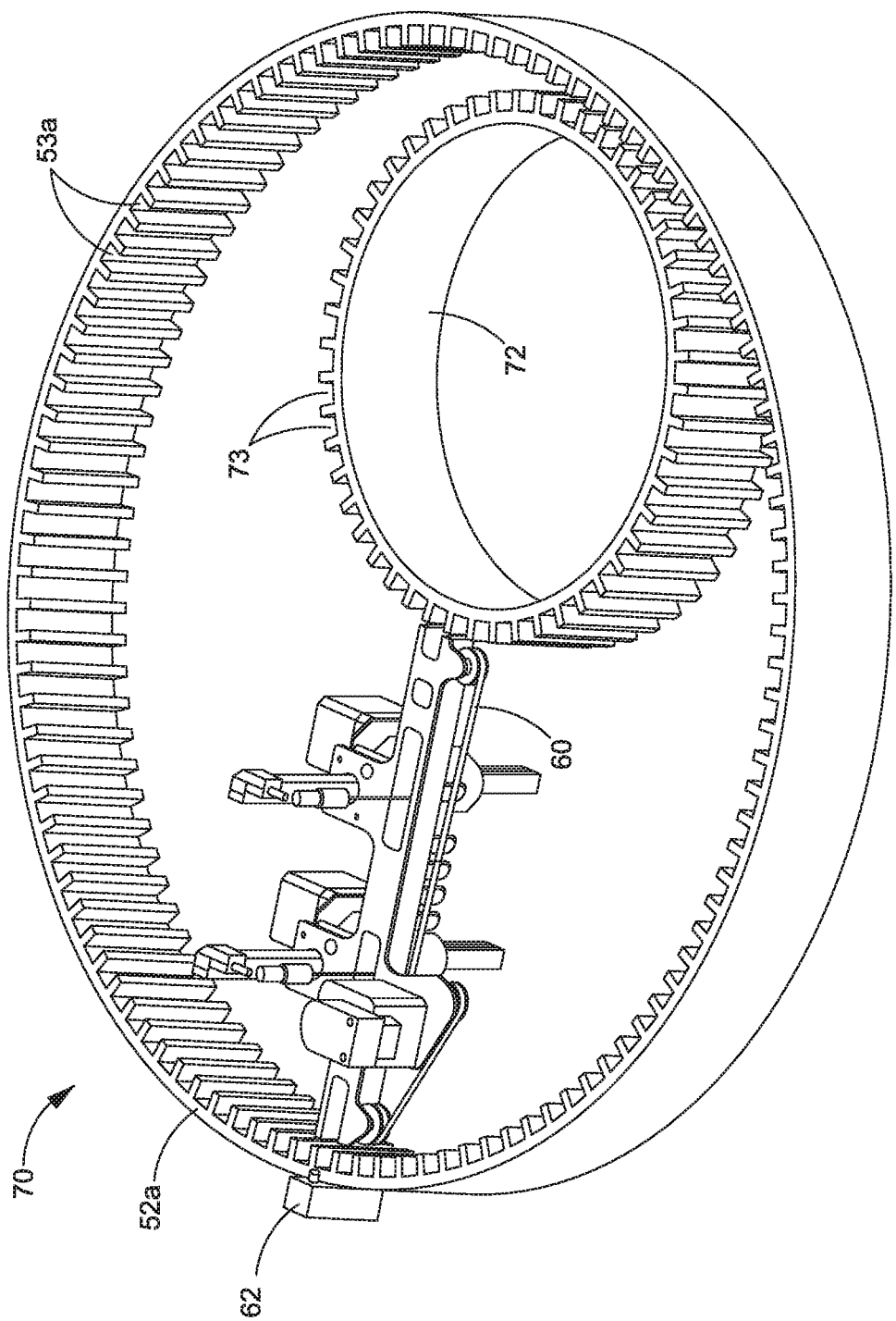
FIG. 7 is a perspective view of an exemplary double incubation ring system for use with some embodiments.

FIG. 7 is a perspective view of a two-ring system 70. Outer ring 52a is thermally regulated and includes a plurality of internal facing slots 53a configured to hold cuvettes. As each of these slots 53a reaches the position coincident with the entrance to bridge 60, that cuvette is moved out of the slot of ring 52a into the motion system of bridge 60 for washing. After washing is completed by washing stations on wash bridge 60, the linear motion system positions the cuvette into a corresponding open slot on internal ring 72. Ring 72 has a plurality of outward facing slots 73 configured to receive and hold cuvettes until the luminometer 66 (FIG. 5) is available for reading the result of the immunoassay. An elevator (not shown) raises the cuvette up for a reading.

Figure 8:
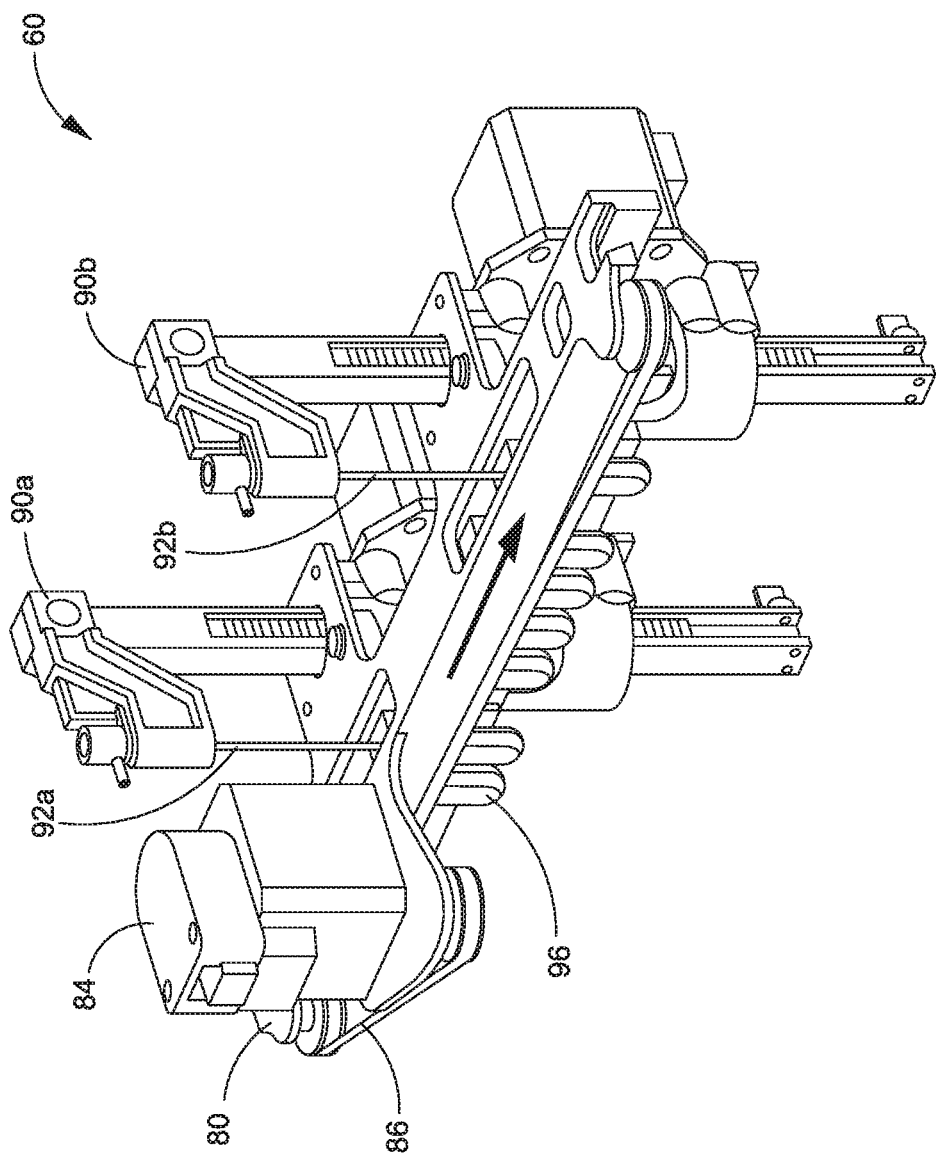
FIG. 8 is a perspective view of an exemplary linear wash bridge for use with some embodiments.
Figure 9:
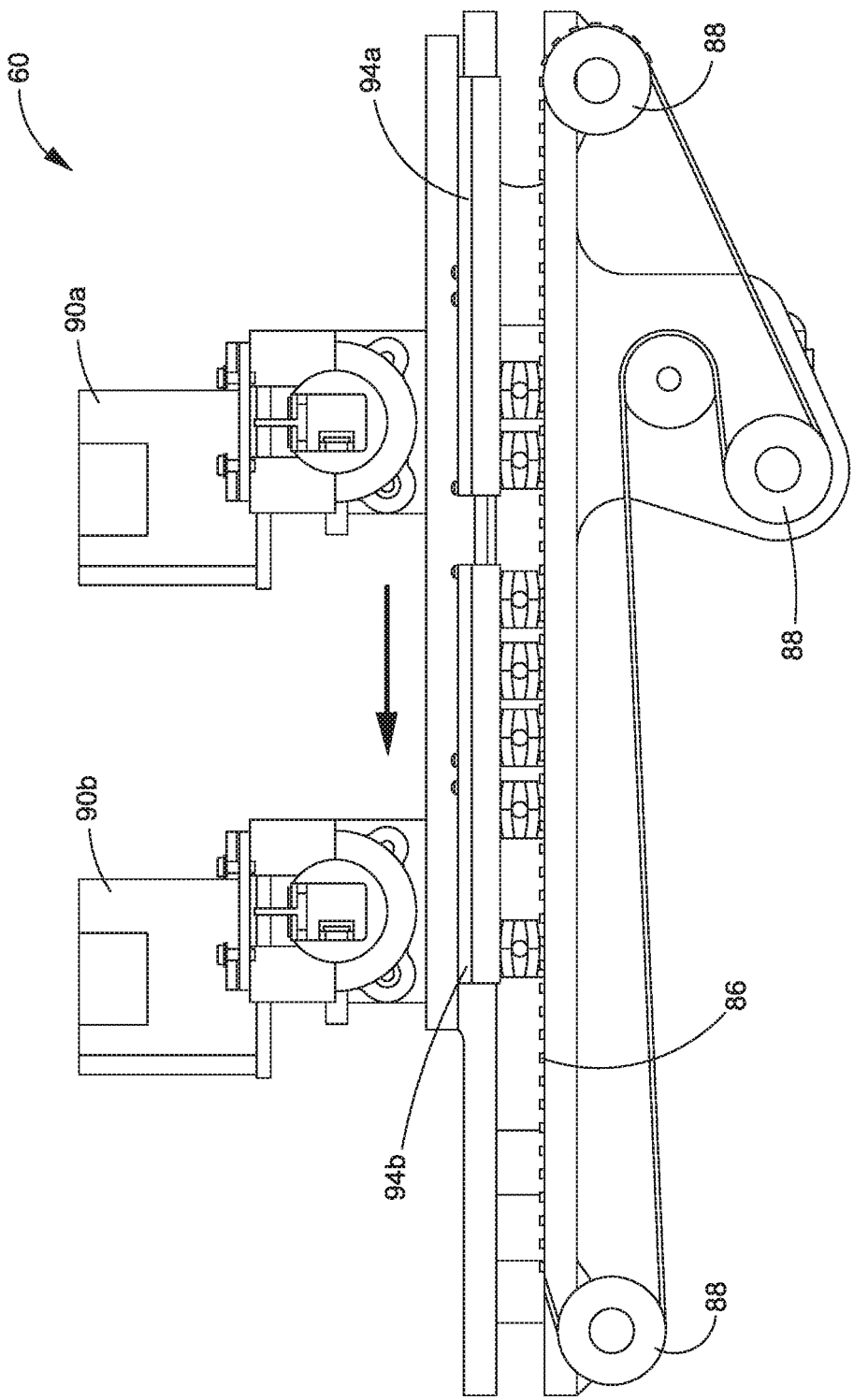
FIG. 9 is a bottom view of an exemplary linear wash bridge for use with some embodiments.

FIG. 8 is an isometric view of wash bridge 60. FIG. 9 is a bottom review of wash bridge 60. Wash bridge 60 includes a linear wash bridge track 80 that can be made out of a suitable rigid material, such as machine aluminum, hard plastic, or fiber-reinforced plastic. This provides a rigid linear constraint on the motion of cuvettes crossing the bridge. Cuvettes are moved along wash bridge track 80 via a motorized belt, such as timing belt 86, which is driven by stepper motor 84. The term motorized belt in this context is a generalized term to describe a flexible belt made of continuous material, such as a rubber timing belt with or without teeth to engage a gear, or a chain made of rigid plastic or metal links. The belt includes features configured to engage the cuvettes, such as a high friction surface or mechanical elements that secure the cuvettes to the moving belt to move the cuvettes in the direction of travel. The motorized belt provides a motive force to transport the cuvettes along the linear wash bridge track 80 of the wash bridge 60.

In some embodiments, timing belt 86 is arranged as a serpentine belt driven by motor 84 and tensioned and positioned by idler pulley's 88. Serpentine belt 86 includes a plurality of ribs that interface corresponding structural features on cuvettes that cross linear wash bridge track 80. Cuvettes pass to wash stations 90a and 90b. Each wash station includes a linearly actuated pipette (92a and 92b) that is driven up and down by a stepper motor (84). Pressure inside the probes can be driven by suitable means, such as by pneumatic or hydraulic pumps or pistons, to provide aspiration and dispense pressures to sip and spit to remove extraneous components of the contents of the cuvettes during a washing process. Prior to interacting with these pipettes, cuvettes 96 passed by linear magnets 94a and 94b. These linear magnets provide a magnetic field that interacts with magnetic particles in the reaction fluid, pulling these particles against the wall of the cuvette. This prevents those particles from being washed by the pipettes during the sip and spit washing process. The remaining particles then luminesce later during a luminosity reading. In this embodiment, two wash stations are provided on linear bridge 60, which is typical for a washing process in the art. This is typical where the washing process at each station is not sufficient to be completed using a single wash cycle. However, it should be appreciated that some embodiments use a single wash station that provides a sufficiently complete wash of the contents of the cuvette in a single washing operation, and that additional wash stations can be provided as part of bridge 60 if the immunoassays being used would benefit from additional washing processes. The number of washing stations used can be chosen based on the overall washing efficiency of a station, which can be affected by such factors as the rinsing agent, the pressure/velocity/volume of the rinsing agent, the volume of the analyte being washed, the magnetic field strength, the needed test accuracy, the cycle time, the number of wash cycles performed at a station, etc.

In some embodiments the serpentine belt 86 is not entirely planar, as shown in FIGS. 8 and 9. Rather, in some embodiments, serpentine belt 86 can be twisted, such that motor 84 need not be mounted in the same plane as wash stations 90a and 90b (e.g., the motor can be mounted underneath with the drive shaft placed horizontally). This can be done for more efficient packaging if necessary.

It is desirable that a single design of wash bridge 60 can be used for single and double incubation ring embodiments. Accordingly, a wash bridge is designed to receive cuvettes from slots on a first incubation ring portion (such as on the internally-facing circumference of a first incubation ring) and move those cuvettes with linear motive force (such as via a serpentine belt drive) past a suitable number of magnetic wash stations (such as two) before placing the cuvettes into slots on a second incubation ring portion (such as on the internally-facing circumference a same incubation ring or the externally-facing circumference a second internal incubation ring). It should be appreciated that some embodiments of a double-ring system can operate in reverse (from smaller ring to larger ring). In some embodiments, the linear wash bridge can be designed and certified to operate bi-directionally. This can require more or larger magnets, but can result in more flexible scheduling options.

What is claimed is:

1. A linear wash system configured for use in an immunoanalyzer, comprising:
   a first temperature-controlled cuvette incubation ring that has a plurality circumferential slots each configured to hold one of a plurality of sample cuvettes;
   a linear track placed inside and coplanar to the first temperature-controlled cuvette incubation ring and configured to transport the plurality of sample cuvettes;
   a motorized belt configured to engage the plurality of sample cuvettes and provide motive force along the linear track; and
   one or more wash stations along the linear track,
   each wash station comprising
      one or more magnets configured to provide a magnetic field on plurality of sample cuvettes and
      a pipette configured to rinse the contents of each sample cuvette while in the magnetic field of the one or more magnets,
      wherein the linear track terminates in an input end configured to receive each sample cuvette from a first circumferential slot of the first cuvette incubation ring and terminates in an output end configured to deliver each sample cuvette to a second circumferential slot in the first temperature-controlled cuvette incubation.

2. The linear wash system of claim 1, wherein the motorized belt is a serpentine belt.

3. The linear wash system of claim 1, wherein the second circumferential slot is part of the first cuvette incubation ring.

4. The linear wash system of claim 1, wherein the second circumferential slot is part of a second cuvette incubation ring that is non-concentric with the first cuvette incubation ring.

5. An immunoanalyzer comprising:
   a cuvette incubation ring having a plurality of slots on an inner circumference of the incubation ring, each slot being configured to hold a sample cuvette and a drive mechanism to rotate the ring;
   a first set of plurality of pipettes configured to interact with cuvettes in the cuvette incubation ring at predetermined locations;
   a linear wash bridge configured to receive cuvettes from a first location of the cuvette incubation ring, wash the contents of each cuvette, and to deliver each cuvette to a second location of the cuvette incubation ring, the linear wash bridge comprising:
      a linear track placed inside and coplanar to the cuvette incubation ring and configured to transport the plurality of sample cuvettes;
      a motorized belt configured to engage the plurality of sample cuvettes and provide motive force along the linear track; and
      one or more wash stations along the linear track,
         each wash station comprising
            one or more magnets configured to provide a magnetic field on plurality of sample cuvettes and
            a second set of plurality of pipettes configured to rinse the contents of each sample cuvette while in the magnetic field of the one or more magnets,
            wherein the linear track terminates in an input end configured to receive each sample cuvette from a first circumferential slot of the cuvette incubation ring and terminates in an output end configured to deliver each sample cuvette to a second circumferential slot in the cuvette incubation ring; and a luminometer configured to analyze the contents of each cuvette subsequent to each cuvette traveling along the linear wash bridge.

6. The immunoanalyzer of claim 5 further comprising an actuator configured to push each cuvette from the cuvette incubation ring at the input end of the linear wash bridge.

7. The immunoanalyzer of claim 5, wherein the motorized belt is a serpentine belt.

8. The immunoanalyzer of claim 5, wherein the cuvette incubation ring further comprises a heating element mounted in thermal contact with the ring and configured to rotate with the ring.

9. The immunoanalyzer of claim 5, wherein the linear wash bridge further comprises a plurality of magnets mounted to the linear track and is further configured to be placed into another immunoanalyzer having two cuvette incubation rings and to pass cuvettes from one ring to the other, wherein such placement is accomplished without reconfiguring the plurality of magnets.

10. An immunoanalyzer comprising:
- a first cuvette incubation ring having a plurality of slots on an inner circumference, each slot being configured to hold a sample cuvette and a drive mechanism to rotate the first cuvette incubation ring;
- a second cuvette incubation ring having a plurality of slots on an outer circumference, each slot being configured to hold a sample cuvette and a drive mechanism to rotate the second cuvette incubation ring;
- a plurality of pipettes configured to interact with cuvettes in the first cuvette incubation rings at predetermined locations;
- a linear wash bridge configured to receive cuvettes from a first location of the first cuvette incubation ring, wash the contents of each cuvette, and to deliver each cuvette to a second location of the second cuvette incubation ring, the linear wash bridge comprising:
  - a linear track placed inside and coplanar to the first cuvette incubation ring and configured to transport the plurality of sample cuvettes;
  - a motorized belt configured to engage the plurality of sample cuvettes and provide motive force along the linear track; and
  - one or more wash stations along the linear track,
    each wash station comprising
    - one or more magnets configured to provide a magnetic field on plurality of sample cuvettes and
    - a pipette configured to rinse the contents of each sample cuvette while in the magnetic field of the one or more magnets,
    wherein the linear track terminates in an input end configured to receive each sample cuvette from a first circumferential slot of the first cuvette incubation ring and terminates in an output end configured to deliver each sample cuvette to a second circumferential slot in the second incubation ring; and
- a luminometer configured to analyze the contents of each cuvette subsequent to each cuvette traveling along the linear wash bridge.

11. The immunoanalyzer of claim 10, wherein the linear wash bridge is coplanar with the first and second cuvette incubation rings.

12. The immunoanalyzer of claim 10 further comprising an actuator configured to push each cuvette from the first cuvette incubation ring at the first location to the linear wash bridge.

13. The immunoanalyzer of claim 10, wherein the motorized belt is a serpentine belt.

14. The immunoanalyzer of claim 10, wherein each cuvette incubation ring further comprises a heating element mounted in thermal contact with each ring and configured to rotate with each ring.

15. The immunoanalyzer of claim 10, wherein the linear wash bridge further comprises a plurality of magnets mounted to the linear track and is further configured to be placed into a different immunoanalyzer having a single cuvette incubation ring and to pass cuvettes from one location on the single cuvette incubation ring to another location on the single cuvette incubation ring, wherein such placement is accomplished without reconfiguring the plurality of magnets.

* * * * *